United States Patent [19]
Itoh et al.

[11] Patent Number: 5,393,953
[45] Date of Patent: Feb. 28, 1995

[54] ELECTRON-BEAM HEATING APPARATUS AND HEATING METHOD THEREOF

[75] Inventors: Kazunori Itoh; Masafumi Kumano, both of Sendai, Japan

[73] Assignees: Ricoh Company, Ltd., Tokyo; Ricoh Research Institute of General Electronics, Co., Ltd., Natori, both of Japan

[21] Appl. No.: 6,075

[22] Filed: Jan. 15, 1993

[30] Foreign Application Priority Data

Jan. 20, 1992 [JP] Japan ................................. 4-028961

[51] Int. Cl.6 ........................................... B23K 15/00
[52] U.S. Cl. ........................... 219/121.34; 219/121.12
[58] Field of Search ...................... 219/121.34, 121.35, 219/121.12

[56] References Cited

U.S. PATENT DOCUMENTS 4,315,131  2/1982  Townend et al. .......... 219/121.33 X

*Primary Examiner*—C. L. Albritton
*Attorney, Agent, or Firm*—Cooper & Dunham

[57] ABSTRACT

An electron-beam heating apparatus in which an electron-beam of a stable intensity can be obtained. The apparatus is provided with a heating unit having two electrodes comprising a cathode and an anode. A heating of a material is performed by using an electron-beam generated by glow discharge generated in a space between the two electrodes. The apparatus is provided with an electric power source and a current control unit. The electric power source supplies an electric current to the electrodes so as to generate the glow discharge in a space between the two electrodes. The current control unit controls the current flowing to the cathode so as to be constant to obtain a constant glow discharge formed in a space between the two electrodes. A constant electron-beam is obtained by the glow discharge.

13 Claims, 9 Drawing Sheets

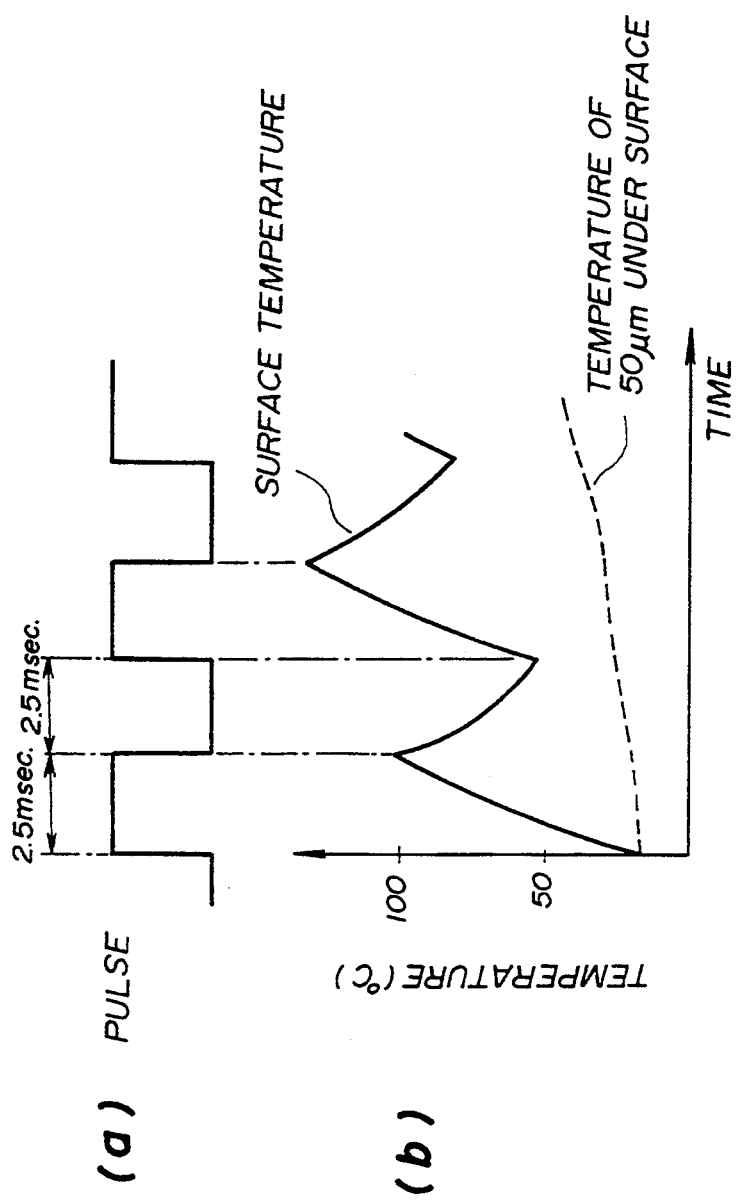

ELECTRON-BEAM HEATING APPARATUS AND HEATING METHOD THEREOF

BACKGROUND OF THE INVENTION

The present invention generally relates to an electron-beam heating apparatus and a heating method thereof, and more particularly to an electron-beam heating apparatus and a heating method which is used for performing a heat treatment for a material, such as a semiconductor, by means of electron-beam heating.

Generally, annealing of a material for semiconductors, which annealing performed in various manufacturing processes or in various activating processes, is performed by heating of the material. The annealing of material includes activation annealing of an ion-implanted semiconductor material, reflowing for planation of an insulating layer, and sintering of metal circuits. The activating process includes activating of thin film electronic devices on an insulating substrate in liquid crystal TFT. Particularly, for annealing technology in manufacturing process of highly integrated electronic devices such as semiconductor devices or thin film device, it is required to heat a surface in a short time without affecting inside the substrate. Electron-beam heating is suitable for this requirement. In order to heat a material, there are some methods such as using an electron-beam, a laser beam or a lamp beam. The electron-beam method has an advantage of wide application as compared to other methods as this method can be applied to any material for surface heating.

Conventionally, the electron-beam heating apparatus disclosed in "Plasma Annealing for Ion Irradiated Semiconductor", Appl. Phys. Lett.39(8), Oct. 15, 1981, written by N. J. Ianno et al., is known. This apparatus is schematically shown in FIG. 1. A chamber 50 is maintained in low vacuum by introducing 50-100 torr of helium gas. In this condition, a voltage difference of 10-80 mA is applied between a cathode 51 and an anode 52 so as to generate a discharge in two separate regions. One of the two regions is a cathode dark space formed near the cathode 51. The other is a negative glow-discharge region formed on the side of the anode 52 opposite to the cathode 51. In a stable condition, electrons are emitted from the cathode 51 by bombardment of ions in gas-discharge. These electrons are effected by a high intensity electric field in the cathode dark space region and are accelerated in a direction toward the negative glow-discharge region. These electrons are formed in an electron-beam having a high energy. On the other hand, little electric field is formed in the negative glow-discharge region, and the glow discharge is maintained by the high energy electron-beam from the cathode dark space region. A length of the glow-discharge region is equal to a length of the region where the high energy electron-beam exists. The high energy electron-beam, incident on a material 53 after passing through the glow-discharge region as a glow electron beam, performs annealing of the material 53. It should be noted that in the apparatus shown in FIG. 1, a magnetic lens 54 is additionally provided so as to focus the electron-beam on the material 53.

The merit of the apparatus is in that an energy of the electron-beam, which corresponds to a depth of penetration of electron, can be independently controlled from the power of the beam (number of electrons therein) required for annealing. Namely, the energy of the glow electron-beam can be independently varied by varying the voltage applied between the cathode 51 and the anode 52, and the power of the electron-beam can be varied by varying the pressure inside the chamber 50. The power of the electron-beam is proportional to the current flowing to the cathode. This characteristic of the glow electron-beam is advantageous particularly when annealing a material that has a slight damage, for example a material whose surface is implanted with ions. The above mentioned slight damage of the material includes, for example, an island-like amorphous layer formed on a surface layer of the material. The island-like amorphous layer may be caused, for example, by a lattice defect formed during ion implantation to an Si wafer; this amorphous layer may grow to a continuous amorphous layer. A lattice defect can be easily corrected by means of a relatively low temperature. However, an island-like amorphous layer requires a relatively long time and a relatively high temperature to be corrected. Further, activation of the island-like amorphous layer takes a relatively longer time to be corrected than the continuous amorphous layer. The glow-discharge electron-beam heating can perform an annealing for the above mentioned slight damage in a short time by selectively heating a region of a surface of the material at a predetermined depth.

However, it was discovered by the applicant that the above mentioned glow-discharge region is adjacent to an arc-discharge region where an arc discharge is generated, and that the glow discharge shifts to an arc discharge when an increase or a concentration of electric current occurs on a part of or on an entire surface of the cathode 51. If the glow discharge shifts to the arc discharge, the cathode dark space region formed near the cathode 51 is reduced. Accordingly, the acceleration of the electron-beam is reduced, resulting in that the energy of the electron-beam is decreased to a level insufficient to perform an annealing. Therefore, there is generated a fluctuation of the heating characteristics, and thus a good and stable annealing is not obtained.

SUMMARY OF THE INVENTION

It is a general object of the present invention to provide an electron-beam heating apparatus and a heating method in which the above mentioned disadvantages are eliminated.

A more specific object of the present invention is to provide an electron-beam heating apparatus and a heating method by which good and stable annealing of a material is performed.

Another object of the present invention is to provide a controlling unit for controlling a discharge in a heating region by controlling an electric current supplied to electrodes.

Another object of the present invention is to provide a heating method by which a surface of a material to be heated is heated without heating an inner portion of the material.

In order to achieve the above mentioned objects, an electron-beam heating apparatus according to the present invention comprises:

- a heating unit having two electrodes comprising a cathode and an anode, a heating of a material being performed by using an electron-beam generated by glow discharge in a space between the two electrodes;
- an electric power source supplying an electric current to the electrodes so as to generate the glow discharge in a space between the two electrodes; and a current controlling unit for controlling the current flowing to the cathode so as to control a discharge in a space between the two electrodes.

A heating method of an electron-beam heating apparatus according to the present invention comprises:

controlling a current for generating the glow discharge so that the current is pulsed;

supplying the pulsed current to a cathode so as to generate a glow discharge; and radiating an electron-beam generated by the glow discharge to a material to be heated.

According to the apparatus of the present invention, a shift of a glow discharge to an arc discharge is prevented by precise control of current supplied to electrodes, the control being performed by the current controlling unit. Therefore, a good stability of heating is obtained in an annealing operation without changing a size of electrodes used in the electron-beam heating apparatus. And, according to the heating method of the present invention, a surface of the material can, by means of the pulsed electron-beam, be heated without heating the inner portion of the material.

Other objects features and advantages will become more apparent from the following detailed description when read in conjunction with the accompanying drawings.

BRIEF DESCRIPTION OF THE DRAWINGS

FIG. 7A showing a condition where the current controlling unit has only a constant-current control unit; FIG. 7B showing a condition where the current control circuit has a current controlling unit, switching unit, and gate control unit;

FIG. 9 is a graph with a time chart for explaining an operation performed by the electron-beam heating apparatus shown in FIG. 8.

DETAILED DESCRIPTION OF THE PREFERRED EMBODIMENTS

Figure 1:
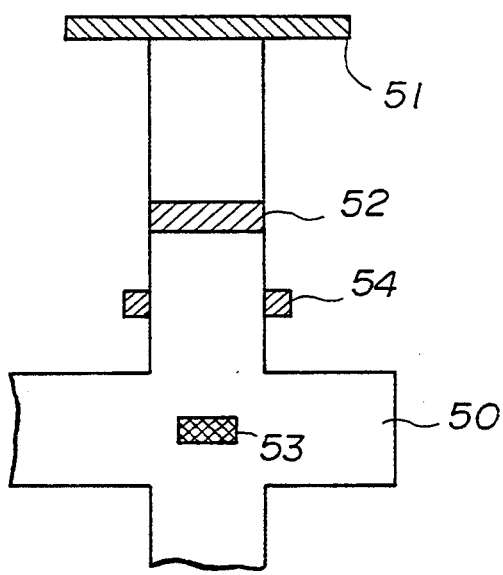
FIG. 1 is a schematic illustration of an example of a conventional electron-beam heating apparatus.
Figure 2:
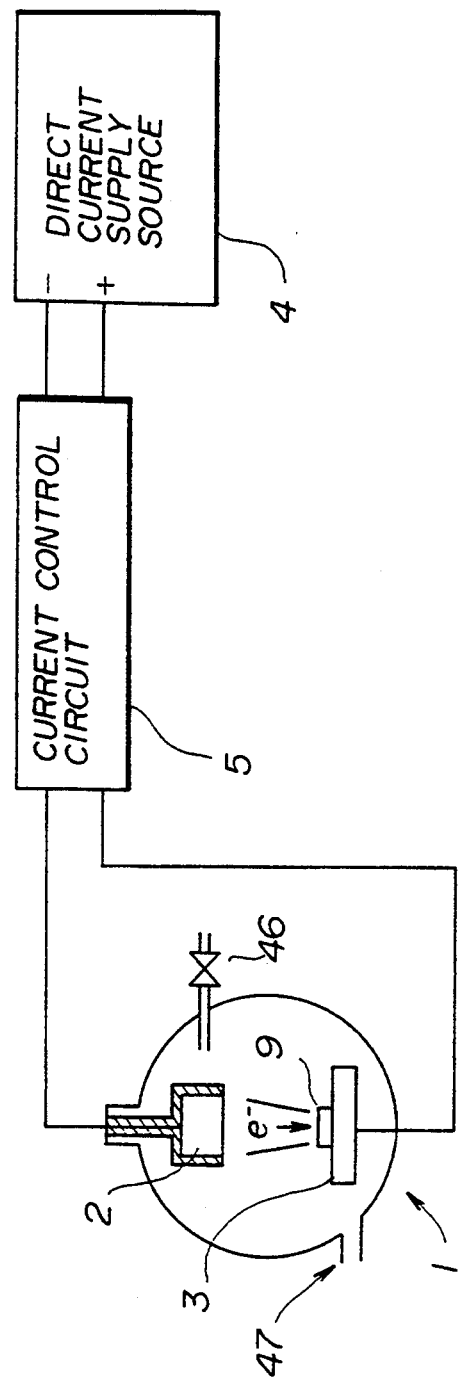
FIG. 2 is a schematic illustration of a structure of a first embodiment of an electron-beam heating apparatus according to the present invention.

A description will now be given, with reference to FIG. 2, of a first embodiment of an electron-beam heating apparatus according to the present invention. FIG. 2 is a schematic illustration of a structure of a first embodiment of an electron-beam heating apparatus according to the present invention. This electron-beam heating apparatus has a chamber 1 in which a heating operation is performed. A cathode 2 and a holder 3 functioning as an anode are provided in the chamber 1. The holder 3 holds a semiconductor material 9 to be annealed by heat treatment. The cathode 2 and the holder 3 are connected to a high voltage direct-current supply source 4 routed through a current control circuit 5. A potential difference, which generates a glow discharge, is applied between the cathode 2 and the holder 3 by the direct-current supply source 4 via the current control circuit 5. A glow electron-beam is emitted from the cathode 2 toward the material 9.

The chamber 1 is provided with a gas introducing port 46 and a gas exhausting port 47 so as to introduce a gas into the chamber 1 and maintain a pressure of the gas inside the chamber 1 at 0.1–100 torr. A gas that may be used to fill the chamber 1 is, for example, helium, which helps to generate a stable glow discharge, but other gases may be used. As a material of the cathode 2, any material having a high electron-emission may be used.

Although in this embodiment the holder 3 functions as an anode in addition to having the function of holding the material 9, an anode may be independently provided between the cathode 2 and the holder 3. Additionally, a magnetic lens may be provided so as to focus an electron-beam on the material 9.

Figure 3:
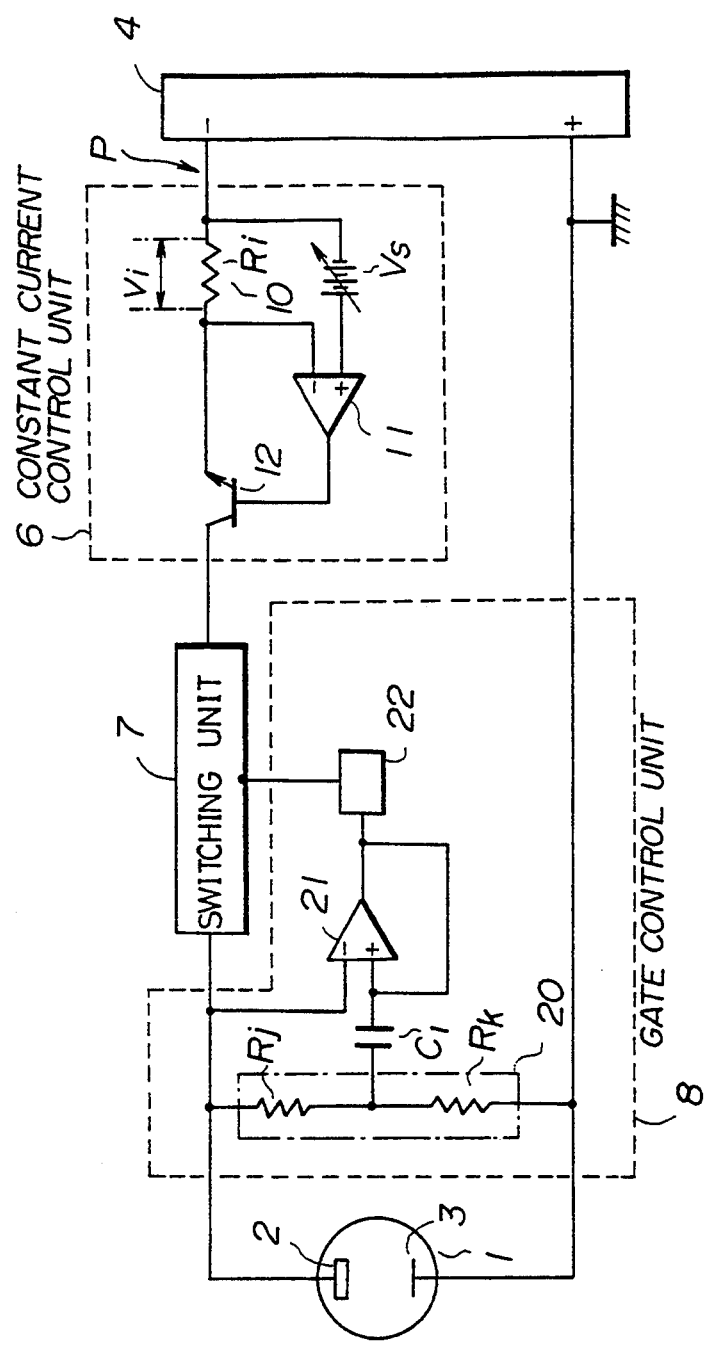
FIG. 3 is a circuit diagram of a structure of a controlling circuit shown in FIG. 2.

FIG. 3 is a circuit diagram of a structure of a current control circuit shown in FIG. 2. The current control circuit 5 is provided for controlling a current used for generating a glow discharge, the current being supplied from the direct-current supply source 4. The current control circuit 5 comprises a constant-current control unit 6, a switching unit 7, and a gate control unit 8.

Figure 4:
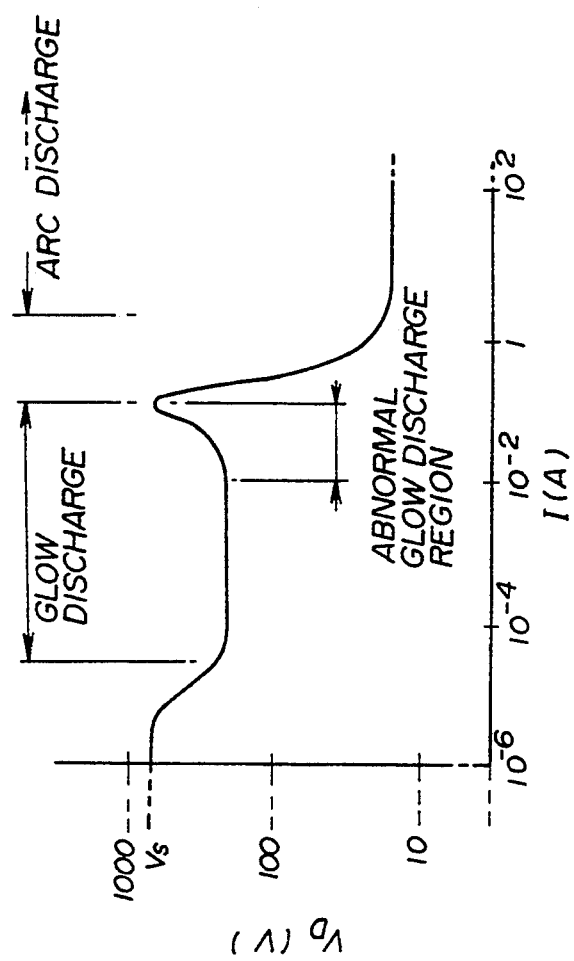
FIG. 4 is a graph showing a the typical current-voltage characteristics.

FIG. 4 is a graph showing a typical current-voltage characteristics of discharge generated under a low vacuum condition. Vs shown in FIG. 4 is a sparking potential which is a voltage when the discharge begins, and $V_D$ is a maintaining potential which is a voltage necessary to maintain a discharge. By the voltage curve shown in FIG. 4, it is apparent that an abnormal glow discharge region shows a positive resistance characteristics. In order to perform a stable annealing of the material 9, it is required to control the intensity of electron-beam irradiated to the material 9. The constant-current control unit 6 is provided for controlling a current supplied to the electrodes under the abnormal grow discharge region conditions, that is, the constant-current control unit 6 performs a control against a circuit having a positive resistance characteristic. Namely, the constant-current control unit 6 performs a constant-current control by means of a negative feedback control on a current flowing to the cathode 2. More specifically, the unit 6 decreases the current when an increase of the current flowing to the cathode 4 is detected, and the unit 6 increases the current when a decrease of the current is detected.

The constant-current control unit 6 comprises a current detector 10, a differential amplifier 11, and a transistor 12. The current detector 10 detects a current flowing a current line P. The differential amplifier 11 detects increase/decrease of the current flowing through the current line P in accordance with the current detected by the current detector 10. The transistor 12 turns off so as to limit the current flowing the current line P when an increase of the current is detected by the differential amplifier 11; the transistor 12 turns on so as to increase the current when a decrease of the current is detected by the differential amplifier 11. The constant-current control unit 6 further comprises a bias voltage source Vs so as to control the current increase/decrease detection characteristics of the differential amplifier 11.

It should be noted that though in this embodiment, the current detector 10 comprises a resistor Ri, and the current value is detected as a potential difference between the ends of the resistor Ri, other methods may be employed for the current detection, and the constant-current control unit 6 may be realized by a method other than performing a constant-current control by a negative feedback control.

In the meantime, it is evident from FIG. 4 that an arcing, which is a shift from a glow discharge to an arc discharge, is caused by an increase of the current beyond the current needed for the glow discharge. When the shift from an abnormal glow discharge to an arc discharge occurs, the circuit comprising the cathode 2 and the holder 3 (anode) undergoes a change from having positive resistance characteristics to having negative resistance-characteristic An arcing caused by an increase of the current due to instability of the direct-current supply source 4, which increase of the current can be detected on the current line P, is prevented to some degree by the above mentioned control performed using the constant-current control unit 6.

However, there is an apparent increase of the current density (a local increase of current in a portion of the surface on the cathode) due to a local concentration of an electric field on a surface of the cathode 2; the concentration of the electric field happens when dusts become adhered to the surface of the cathode 2 or when there exists a roughness of the surface of the cathode 2, for example, and the apparent increase of the current density cannot be detected by observing a current on the current line P.

The switching unit 7 and the gate control unit 8 are provided for preventing the arcing caused by the above mentioned apparent increase of the current density. The switching unit 7 and the gate control unit 8 perform a positive feedback control on the current flowing the current line P. Namely, the switching unit 7 turns on/-off the current line P so as to control the current flowing in the current line P in accordance with signals from the gate control unit 8.

The gate control unit 8 comprises a potential-change detecting unit 20, a comparator 21 and a time setting unit 22. The potential-change detecting unit 20 detects a potential change between the cathode 2 and the holder 3 (anode). The comparator 21 detects a negative resistance of the circuit, based on the potential change detected by the potential-change detecting-unit 20. The time setting unit 22 determines a period of time $t_s$ for closing or shunting the current line P when the negative resistance is detected by the comparator 21. In this embodiment, the potential-change detecting unit 20 comprises a resistor Rj and Rk, and the comparator 21 comprises an operational amplifier. A combination of the potential-change detecting unit 20 and the comparator 21 functions as a detecting unit for detecting negative resistance characteristics.

It should be noted that since the discharge voltage is applied to the comparator 21, the comparator must be able to withstand a high voltage. In this embodiment, the resistors Rj and Rk have a resistance ratio of 1:1000 so as to apply 1/1000 of the potential difference applied between the cathode 2 and the holder 3 (anode) to the comparator 21. The potential-change detecting unit 20 may be comprised by a various elements, for example, a combination of a photo-transistor and a photo-diode. The comparator may also be comprised of an element other than an operational amplifier, but using a high speed operating element is preferable so that a quick response to the current control is obtained. In this embodiment a quickly responding unit is realized by having an equal differentiating circuit comprising a capacitor C1.

The time setting unit 22 may comprise an oscillator such as a multivibrator.

Figure 5:
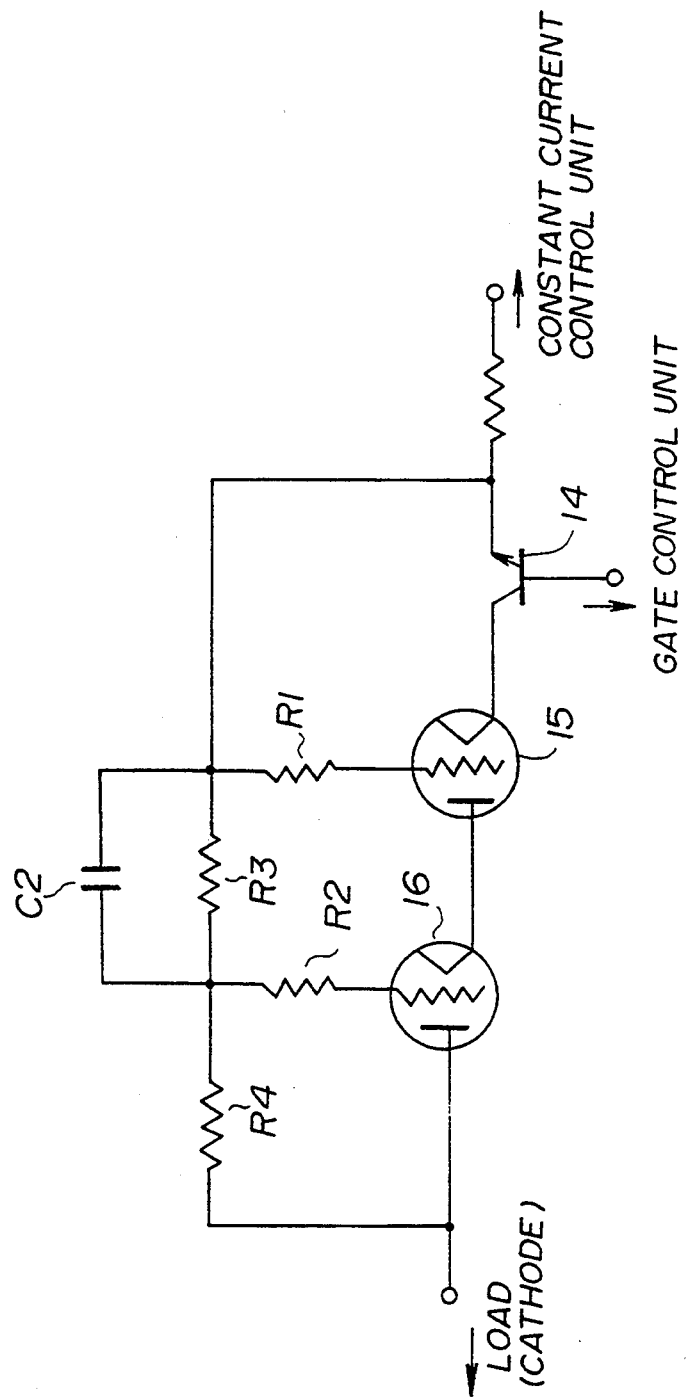
FIG. 5 is a circuit diagram of an embodiment of a switching unit shown in FIG. 3.
Figure 6:
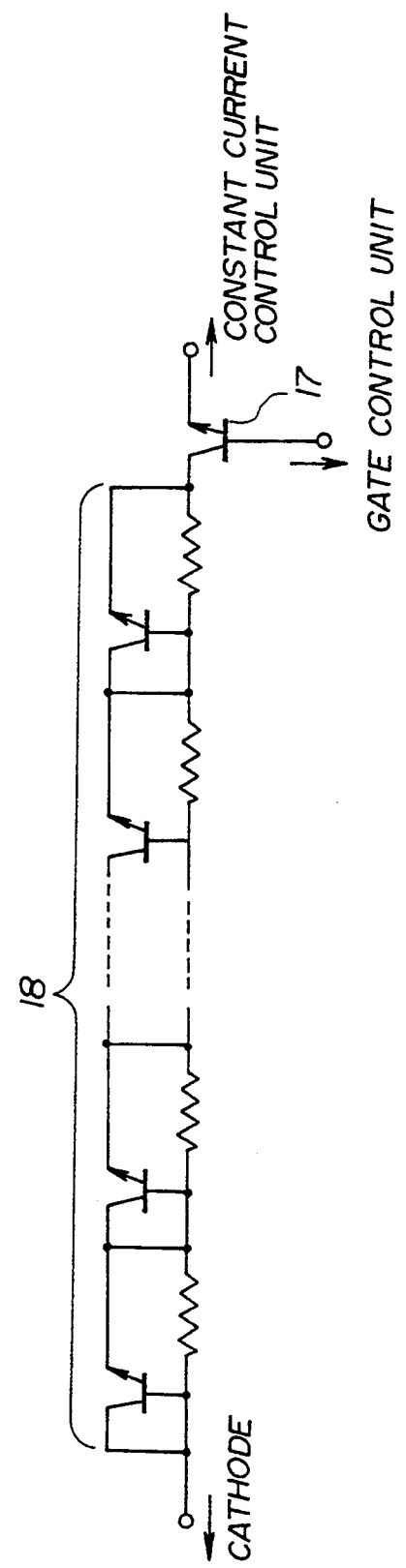
FIG. 6 is a circuit diagram of an embodiment of a switching unit shown in FIG. 3.
Figure 8:
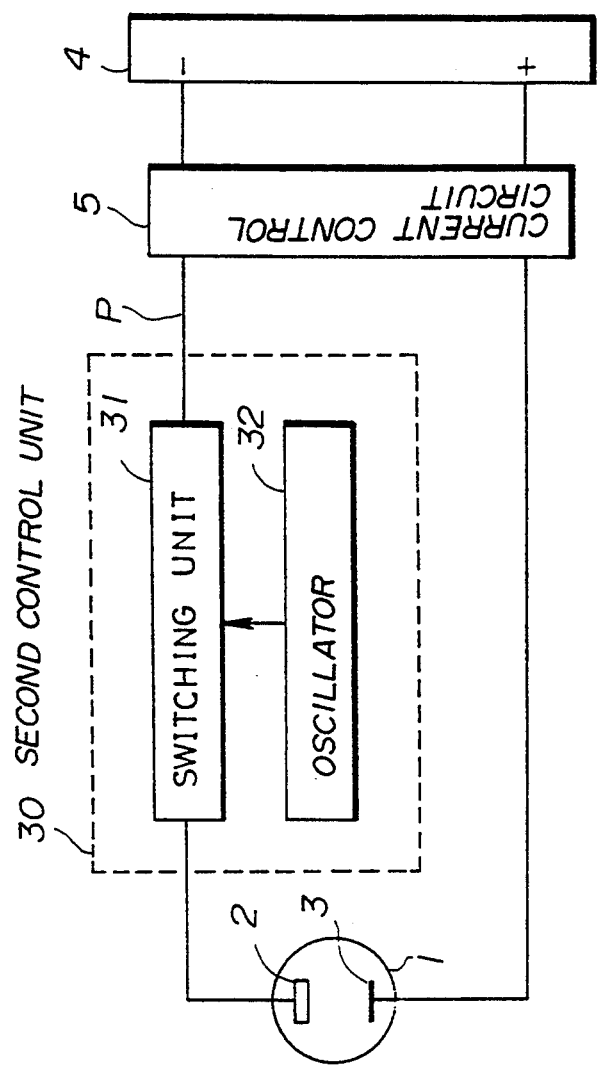
FIG. 8 is a schematic illustration of a structure of a second embodiment of an electron-beam heating apparatus according to the present invention.

The switching unit 7 may be a structure as shown in FIG. 5 or FIG. 8. The switching unit 7 is required to withstand the discharge voltage of a glow discharge, which is a few KV. An example of the switching unit 7, as shown in FIG. 5, comprises a transistor 14 that functions as a gate element, vacuum tubes 15, 18, resistors R1, R2 each of a few KΩ, resistors R3, R4 each of more than 1 MΩ, and a capacitor having ability to withstand more than 5 KV. Another example of the switching unit 7, as shown in FIG. 6, comprises a transistor 17 which functions as a switching element, and a plurality of transistors 18 provided for obtaining a required voltage withstanding capability. The structure of the switching unit is not limited to the examples shown in FIG. 5 and FIG. 6 as long as the unit has a sufficient voltage withstanding ability and a switching function.

Next, a description will be given of an operation of the first embodiment of an electron-beam heating apparatus mentioned above. Referring to FIG. 2, when a potential is applied between the cathode 2 and the holder 3 via the current control circuit 5, a glow discharge is generated between the cathode 2 and the holder 3. Electrons are emitted from the cathode 2 and the electrons are incident upon the material 9 as an electron-beam. This incidence of the electron-beam allows heating of the material 9 to a predetermined depth from the surface, and thus annealing is performed against only the predetermined depth.

Now referring to FIG. 3, if a current flowing the current line P fluctuates due to instability of the direct-current supply source 4, the constant-current control unit 6 of the current control circuit 5 controls the current by means of a negative feedback control. Namely, when the circuit is in a condition where an abnormal glow discharge occurs, the unit 6 controls the current so as to increase the current (the transistor 12 is turned on) when the current tends to decrease, and the unit 6 controls the current so as to decrease the current (the transistor 12 is turned off)-when the current tends to increase. By this operation, in an abnormal glow-discharge condition, the current flowing to the cathode 2 is controlled so as to remain constant. Thus, a shift of abnormal glow-discharge to an arc discharge due to an increase in the current, which increase is caused by instability of the direct-current supply source 4, is effectively prevented.

As mentioned above, current fluctuation due to instability of the direct-current supply source can be prevented by the constant-current control unit 6, but this control is limited to the state where the heating characteristics of the electron-beam in the chamber 1 are stable. The shift to the arc discharge cannot be prevented by the constant-current control unit 6 when the heating characteristics is not stable, that is, an apparent increase of current density occurs on the surface of the cathode 2.

However, in this embodiment, the arcing due to instability of the heating operation in the chamber 1 is prevented by provision of the switching unit 7 and the gate control unit 8. When the arcing starts, due to an increase of local current density on the cathode 2, the gate control unit 8 detects a negative resistance-characteristic, that is a decrease of potential difference between the cathode 2 and the holder 3. When the gate control unit 8 detects a negative resistance-characteristic, the time setting unit 22 of the gate control unit 8 sends a signal to the switching unit 7 so as to stop (or decrease) the current for a predetermined period of time $t_s$. The switching unit 7 closes the current line P or decreases the current for the predetermined period of time $t_s$, and thus the current flowing from the direct current source to the cathode 2 is appropriately controlled. As a result the increase of the local current density is suppressed and even if arcing has started, the discharge returns to an abnormal glow discharge.

It should be noted that the arcing may be prevented by increasing the area of the surface of the cathode 2. However, increasing the surface area of the cathode 2 results in an increase of scale of the apparatus. On the other hand, the above mentioned embodiment can prevent arcing by providing only the current control circuit. Therefore, a good heating operation is obtained while maintaining the present compact size scale of the apparatus.

Figure 7A:
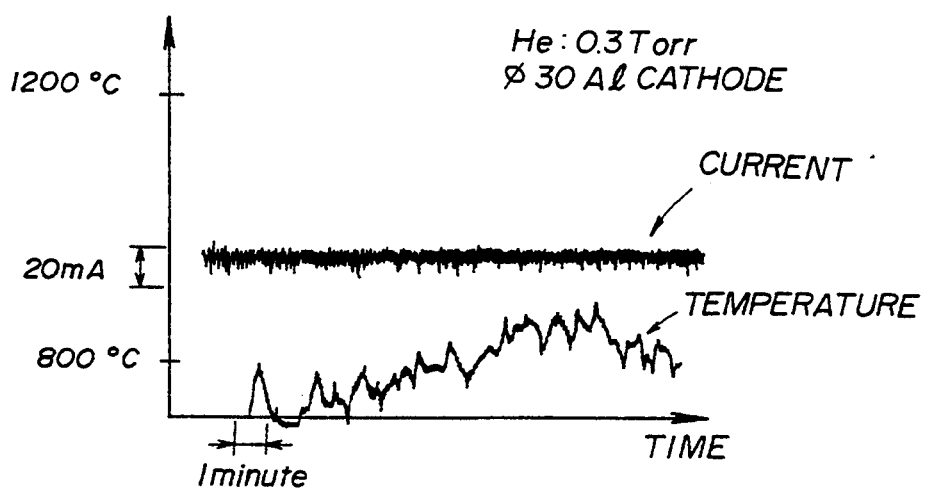
FIGS. 7A and 7B are graphs for explaining a heating characteristics.
Figure 7B:
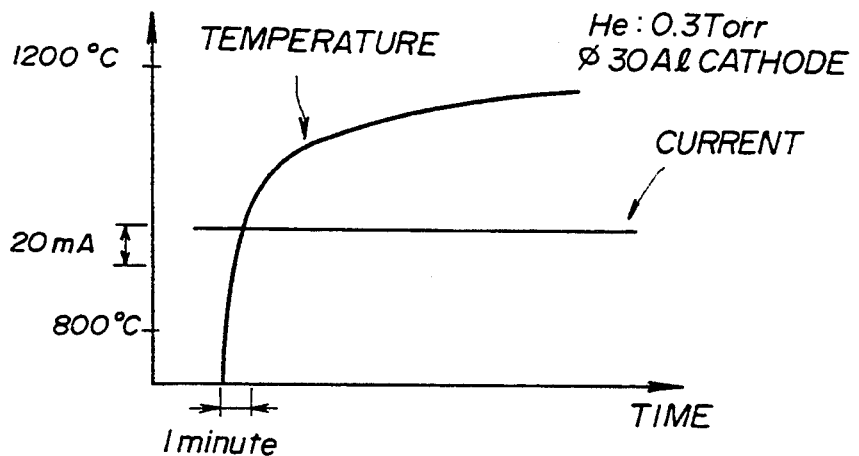

FIGS. 7 are graphs for explaining the heating characteristics of an electron-beam heating apparatus. FIG. 7A shows a graph of the heating characteristics in a condition where the current controlling unit has only a constant-current control unit 6. FIG. 7B shows a graph of the heating characteristics in a condition where the current control circuit 5 has a current control unit 6, a switching unit 7, and a gate control unit 8. As apparent from the comparison of the two graphs, by adding the switching unit 7 and the gate control unit 8, the fluctuation of the current is greatly reduced resulting in effective heating and good stability of the temperature of the material.

It should be noted that although the above mentioned embodiment comprises two feedback control units, one for controlling current fluctuations due to the instability of the direct-current supply source, and the other for controlling increases of local current density, a current control circuit having only one, either one, of the above two units may be used for obtaining a good stability of heating performed by an electron-beam heating apparatus.

Next, a description will be given of a second embodiment according to the present invention. FIG. 8 is a schematic illustration of a structure of a second embodiment of an electron-beam heating apparatus according to the present invention. The second embodiment comprises the first embodiment mentioned above and, in addition, includes a second control unit 30. The second control unit 30 is provided for controlling the current for generating an electron-beam by supplying additional signals.

The second control unit 30 comprises a switching unit 31 and an oscillator 32. The oscillator 32 sends signals to the switching unit 31 so as to allow the current flowing through the current line P to be intermittent current. That is, the oscillator 32 sends signals to the switching unit 31 so that the switching unit 31 allows the current flow for only predetermined periods of time $t_p$ and so that the current is stopped for the rest of the time. Accordingly pulse-like current is supplied to the cathode 2 as indicated by (a) of FIG. 9. It should be noted that pulse cycle time $t_p$ of the switching unit 31 of the second control unit 30 should be greater than pulse cycle time $t_s$ of the switching unit 7 in order to prevent a shift to an arc discharge even during the pulse cycle time $t_p$.

With the above mentioned structure, a good pulse-like electron-beam was obtained by operating the switching unit 7 with $t_s$ less than 100 μsec. and gate 31 with $t_p$ of from 100 μsec. to 1 sec. FIG. 9 is a graph with a time chart for explaining an operation performed by the electron-beam heating apparatus shown in FIG. 8. The current flowing to the cathode 2 was set to 100 mA, and the on/off times of the current pulses were set to 2.5 msec. As shown in (b) of FIG. 9, the surface temperature of the material can be selectively raised, and the temperature inside the material can be maintained low.

These heating characteristics are advantageous to an annealing operation for a semiconductor device or a thin film device that requires a heating of a surface without affecting the inside of the material. For example, by performing an activating annealing for a phosphorus-ion implanted Si wafer by using the electron-beam heating apparatus according to the above mentioned embodiment, the activation of the Si wafer is obtained under a temperature of less than 400° C.

A description will now be given of a reason why the pulse-like electron-beam can heat the surface of the material without raising the temperature of the inside of the material. Generally, a heat conduction quantity q between two surfaces in a plane-like material is represented by the following equation.

$$q = Ak(t_1 - t_2)/l$$

where;

A is an area where the heat flows;

k is a heat conductivity (Kcal/m.hr.°C.);

$t_1$ is a temperature of one surface of the material;

$t_2$ is a temperature of the other surface of the material; and l is a distance between the two surfaces.

On the assumption that the surface temperature $t_1$ is constant, the temperature $t_2$ of the other surface is raised in accordance with k, and finally $t_2$ becomes a constant temperature. In order to maintain the same constant state, a predetermined heat amount q must be supplied from the surface having a temperature of $t_1$ to a second surface having a temperature of $t_2$. If $t_1$ fluctuates like a pulsed wave, a predetermined heat quantity sufficient for maintaining the temperature $t_2$ is not supplied to the second surface and thus the temperature $t_2$ decreases. Accordingly, if a surface of a material is heated by a pulse-like electron beam with a narrow pulse width, the surface temperature is raised before a sufficient heat is conducted inside the material.

As shown in the following table, diffusion of the phosphorus ion as performed by the apparatus according to the above mentioned second embodiment is greatly smaller than that performed in an ordinary electric furnace.

|   | diffusion depth |
|---|---|
| immediately after ion implantation | 1000 Å |
| annealing performed by using pulsed electron-beam | 1100 Å |
| after annealing performed by electric furnace (900° C., 30 min.) | 7500 Å |

A diffusion depth of the ion is 1000 Å immediately after the implantation of the ion and after annealing processed by the pulsed electron-beam heating apparatus, the diffusion depth is 1100 Å. On the other hand, a diffusion depth processed by ordinary heating process, which uses an electric furnace, reaches as high as 7500 Å. Namely, the electron-beam heating apparatus according to the second embodiment can provide an annealing method that has no undesired effect on an ion implanted materials.

The present invention is not limited to the specifically disclosed embodiments and variations and modifications may be made without departing from the scope of the present invention.

What is claimed is:

1. An electron-beam heating apparatus comprising:
    a heating unit having two electrodes comprising a cathode and an anode, a heating of a material being performed by using an electron-beam generated by glow discharge in a space between said two electrodes; and
    an electric power source supplying an electric current to said electrodes so as to generate said glow discharge in a space between said two electrodes;
    a current controlling circuit for controlling said current flowing to said cathode so as to control a discharge in a space between said two electrodes, wherein said current controlling circuit comprises a constant-current control unit for controlling said current flowing to said cathode by means of a negative feedback control so that an intensity of said current is controlled so as to be constant.

2. The electron-beam heating apparatus as claimed in claim 1, wherein said constant-current control unit comprises a current detector detecting a current flowing to said cathode, a differential amplifier detecting an increase/decrease of said current flowing to said cathode in accordance with the current detected by said current detector, a transistor turning off so as to stop said current flowing to said cathode when an increase of said current is detected by said differential amplifier and turning on so as to allow an increased current flowing in a current line when a decrease of said current is detected by the differential amplifier, and a bias voltage source provided to control a characteristic of detection of the increase/decrease of the current performed by said differential amplifier.

3. The electron-beam heating apparatus as claimed in claim 3, wherein said current detector comprises a resistor, the current being detected as a potential difference between ends of said resistor.

4. An electron-beam heating apparatus comprising:
    a heating unit having two electrodes comprising a cathode and an anode, a heating of a material being performed by using an electron-beam generated by glow discharge in a space between said two electrodes;
    an electric power source supplying an electric current to said electrodes so as to generate said glow discharge in a space between said two electrodes; and
    a current controlling circuit for controlling said current flowing to said cathode so as to control a discharge in a space between said two electrodes, wherein said current controlling circuit comprises a limiting circuit for limiting an increase of said current flowing to said cathode by means of a positive feedback control when said limiting circuit detects a negative resistance-characteristic in a relationship between a discharge voltage and a discharge current.

5. The electron-beam heating apparatus as claimed in claim 1, wherein said current controlling circuit further comprises a limiting circuit for limiting an increase of said current flowing to said cathode when said limiting circuit detects a negative resistance-characteristic in a relationship between a discharge voltage and a discharge current.

6. The electron-beam heating apparatus as claimed in claim 4, wherein said limiting circuit comprises a gate control unit for detecting a negative resistance-characteristic in a relationship between a discharge voltage and a discharge current, and a switching unit for turning on or off a current line through which said current flows to said cathode in accordance with signals from the gate control unit.

7. The electron-beam heating apparatus as claimed in claim 6, wherein said gate control unit comprises a potential-change detecting unit detecting a potential change between said two electrodes, a comparator for detecting a negative resistance of the limiting circuit based on said potential change detected by said potential-change detecting unit, and a time setting unit determining the period of time for turning off said current line when the negative resistance is detected by said comparator.

8. The electron-beam heating apparatus as claimed in claim 7, wherein said switching unit comprises a transistor functioning as a switching element, vacuum tube, resistors having resistances of less than 5 KΩ, resistors having resistances of more than 1 MΩ, and a capacitor having voltage withstanding ability of more than 5 KV.

9. The electron-beam heating apparatus as claimed in claim 7, wherein said switching unit comprises a transistor functioning as a switching element and a plurality of transistors for obtaining a required voltage withstanding ability.

10. The electron-beam heating apparatus as claimed in claim 1, further comprising a second current control circuit for controlling said current flowing to said cathode so that said current is pulsed and is intermittently supplied to said cathode.

11. The electron-beam heating apparatus as claimed in claim 10, wherein said second current control unit comprises a switching unit allowing said current flowing to said cathode to be pulsed in pulses of a predetermined pulse width, and an oscillator sending signals to said switching unit so that said switching unit opens and closes a current line based on said signals.

12. A method for heating a material by using an electron-beam generated by a glow discharge in a space between a cathode and an anode of a heating unit, the method comprising steps of:
    supplying an electric current from an electric power source to said cathode so as to generate said glow discharge;
    controlling said current generating said glow discharge so that said current is pulsed and intermittently supplied to said cathode so as to control said discharge; and
    radiating an electron-beam generated by said glow discharge.

13. The method for heating a material as claimed in claim 12, which further comprises opening and closing a current line in accordance with signals sent by an oscillator so that current flowing to said cathode is pulsed in pulses of a predetermined pulse width.

* * * * *